United States Patent [19]

McCollum et al.

[11] Patent Number: 5,612,416
[45] Date of Patent: Mar. 18, 1997

[54] UNSATURATED HYDROXY DIESTER COPOLYMERS AND THEIR USE IN COATING COMPOSITIONS

[75] Inventors: Gregory J. McCollum, Hampton Township, Allegheny County; Karl F. Schimmel, Penn Hills Boro.; James A. Claar, Washington Township, Westmoreland County; Joseph M. Carney, Reserve Township, Allegheny County; Stephen J. Thomas, Aspinwall, Boro.; Leigh A. Humbert, West Deer Township, Allegheny County, all of Pa.

[73] Assignee: PPG Industries, Inc., Pittsburgh, Pa.

[21] Appl. No.: 541,993

[22] Filed: Oct. 10, 1995

[51] Int. Cl.$^6$ .............. C08L 35/06; C08L 25/14; C08F 222/20
[52] U.S. Cl. .............. 525/123; 525/131; 525/162; 525/163; 525/327.7; 525/328.8; 526/320
[58] Field of Search .............. 526/320; 525/123, 525/162, 163, 327.7, 328.8, 131

[56] References Cited

U.S. PATENT DOCUMENTS

| | | | |
|---|---|---|---|
| 3,270,088 | 8/1966 | Hicks | 525/163 |
| 3,414,635 | 12/1968 | Edwards | 526/320 |
| 3,838,087 | 9/1974 | Pirck | 525/327.7 |
| 5,418,306 | 5/1995 | Shalati et al. | 526/329.1 |
| 5,418,307 | 5/1995 | Valpey, III et al. | 526/329.1 |

OTHER PUBLICATIONS

*Chemical Abstracts*, vol. 58, Columns 14395 and 14396.

B.C. Trivedi and B.M. Culbertson, "Maleic Anhydride", Ashland Chemical Company, Dublin, Ohio, 1982 Plenum Press, New York and London, Chapter 3 Reactions of Functional Groups, pp. 78 thru 81.

Chem. Ber. 119, 3492–3497 (1986).

*Primary Examiner*—David Buttner
*Attorney, Agent, or Firm*—Dennis G. Millman

[57] ABSTRACT

A coating composition is disclosed that comprises (a) a copolymer comprising alternating units of a vinyl monomer and an unsaturated diester monomer in which at least one of the esterifying groups includes a hydroxyl group, and (b) a hydroxy group-reactive curing agent. The diester monomer is formed by first opening an anhydride with an alcohol to form a monoester, and then alkoxylating the remaining acid group on the monoester with an epoxy compound to form a second ester group having hydroxyl functionality.

12 Claims, No Drawings

5,612,416

UNSATURATED HYDROXY DIESTER COPOLYMERS AND THEIR USE IN COATING COMPOSITIONS

BACKGROUND OF THE INVENTION

This invention involves polymers that find utility in coating compositions, more specifically, hydroxy functional polymers that can be cured to form durable coatings by reaction with crosslinking agents that are reactive with hydroxyl groups, such as polyisocyanates, aminoplasts, and anhydrides.

SUMMARY OF THE INVENTION

The copolymer of the present invention comprises alternating units of a vinyl monomer and a diester of an unsaturated anhydride in which at least one of the esterifying groups includes a hydroxyl group. The esterification of the anhydride is carried out in two stages. First, the anhydride is opened with an alcohol to form a monoester. In the second stage, the monoester is oxyalkylated with an epoxy compound, preferably alkylene oxide, whereby a diester is formed, with the second ester group containing a hydroxy group as a product of the reaction with the epoxide. The unsaturated diester is then copolymerized with one or more vinyls to form a copolymer with alternating units of hydroxy-functional diester. The regular placement of hydroxyl groups along the copolymer appears to enhance curing with hydroxyl group reactive curing agents, whereby cured coatings are produced that are characterized by good mar resistance.

DETAILED DESCRIPTION

Unsaturated anhydrides are the preferred starting material for the present invention for their ability to form alternating copolymers with vinyls. Maleic anhydride is preferred due to its availability, but other substituted or unsubstituted anhydrides of dicarboxylic acids may be used. These include, for example, citraconic anhydride, 2,3-dimethyl maleic anhydride, chloro maleic anhydride, dichloro maleic anhydride, and itaconic anhydride. Any unsaturated anhydride having alkyl, aryl, or other substitution may serve the same purpose. Alternatively, a diester of maleic acid or another unsaturated dicarboxylic acid may be used as the starting material, whereby the diester is subsequently transesterified to provide a hydroxy functional ester group.

Any alkyl, cycloalkyl, aryl, or alkaryl alcohol may serve to open the anhydride ring in the first stage of the esterification. Since the primary function of this alcohol is merely to open the anhydride, a wide selection of alcohols and phenols may be used. The use of simple alcohols is preferred, particularly methanol or ethanol. Ether alcohols may also be used.

Oxyalkylating the monoester to a diester is accomplished by reaction with an epoxy compound, particularly an alkylene oxide such as ethylene oxide or propylene oxide. The use of propylene oxide is preferred because it forms a 2-hydroxy group in the ester group. Materials containing glycidyl groups may also be used to open the anhydride, such as alkyl or aryl glycidyl ethers (e.g., butyl glycidyl ether, phenyl glycidyl ether).

The hydroxy functional, unsaturated diester produced from the anhydride is copolymerized with vinyls—either a single type or a combination of different vinyls. The vinyls are chosen such that they are capable of producing an alternating copolymer with the unsaturated diester. Typically, the vinyl component is selected from the group consisting of alpha-olefins, vinyl aromatic compounds or substituted vinyl aromatic compounds, allyl compounds, vinyl ethers, vinyl esters, vinyl acetals, and mixtures thereof. In preferred embodiments, a combination of alpha-olefin and vinyl aromatic monomer (e.g., styrene) are used in approximately equal molar amounts to copolymerize with the unsaturated diester. Acrylic and methacrylic compounds may also be included among the vinyl compounds usable in the copolymerization. Other electron deficient monomers such as dialkyl maleate or dialkyl fumarates may be part of the co-monomer component to be copolymerizied with the hydroxy functional unsaturated diester monomer. These may include dimethyl maleate, dibutyl maleate, dibutyl fumarate, dibenzyl fumarate, ethyl methyl maleate, and the like.

Alpha-olefins useful as co- monomers include the lower alpha-olefins, that is, materials with a carbon chain length of less than 20, preferably those with 2 to 12 carbon chain length, most preferably 4 to 10. Carbon chain lengths below 6 may be used, but are not as convenient because they usually entail use of a pressure reactor. Carbon chain lengths above 10 may be used, but are not preferred because they are not as easily handled during processing. Specific examples include ethylene, propylene, isobutene, diisobutylene, 1-hexene, 1-octene, and 1-decene, and mixtures thereof, with the preferred materials being 1-hexene and 1-octene. Cycloaliphatic olefins are also suitable and include, for example, cyclobutene, cyclopentene, 1methylcyclopropene, methylenecyclopentene, cyclohexene, cycloheptene, cyclooctene, and mixtures thereof.

Vinyl compounds useful as co-monomers may be chosen from aromatic vinyl monomers, preferably styrene, also including substituted styrene compounds. Examples of alpha-substituted vinyl aromatic compounds include vinyl toluene, alpha-methylstyrene, p-isopropyl-alpha-methylstyrene, p-isopropylstyrene, p-methoxy-alpha-methylstyrene, p-methoxystyrene, p-chloro-alpha-methylstyrene, p-chlorostyrene, p-fluoro-alpha-methylstyrene, p-fluorostyrene, p-dimethylamino-alphamethylstyrene, p-dimethylaminostyrene, and the like. Beta-substituted styrene compounds can also be used, such as stilbene, beta-methylstyrene, beta-chlorostyrene, beta-methoxymethylstyrene, beta-methoxystyrene, beta-n-butoxystyrene, betaisobutoxystyrene, beta-tert-butoxystyrene, p-methoxy-beta-methylstyrene, p-methyl-(beta-methylstyrene), p-chloro-beta-methylstyrene, and the like.

Another class of vinyl monomers that may be used are vinyl ethers, which may contain alkyl, aryl or cycloaliphatic groups with a carbon chain length of 1 to 20. Specific examples of vinyl ethers include alkyl vinyl ethers such as methyl, ethyl, isopropyl, 2-ethylhexyl, n-butyl, isobutyl, tert-butyl, 2-chloroethyl, benzyl vinyl ethers, and mixtures thereof. Also suitable are aryl vinyl ethers including methyl propenyl ether (both cis and trans isomers), phenyl vinyl ether, and mixtures thereof. Additionally, 2-phenylvinyl alkyl ethers or thioethers having a carbon chain length not exceeding about 6 wherein the alkyl group can be either straight-chain or branched can be used. Suitable cycloaliphatic vinyl ethers include cyclopentyl and cyclohexyl vinyl ethers, and mixtures thereof. Additional examples of suitable vinyl ether monomers include divinyl ether, 1,2-dimethoxyethylene, p-dioxene, and conjugated dihydroanisole, and mixtures thereof. Information regarding copolymerization of vinyl ethers may be found in J. Poly. Sci., Vol. 48, page 279 (1960) and in *Maleic Anhydride* by B. C. Trivedi and B. M. Culbertson (Plenum Press, New York and London, 1982).

The unsaturated co-monomer may also be selected from allyl compounds including allylbenzene, 2-allylphenol, alpha-allylnaphthalene, 3-allylcyclopentene and mixtures thereof. Functionalized allyl compounds bearing functional groups including hydroxyl, amino, cyano, carboxyl, silane, phosphonate, epoxy and ether moieties include allyl alcohol, methallyl alcohol, 2-phenylallyl alcohol, 2-methylene propanediol, 1,1-dimethylallyl alcohol, methallylamine, N-allylacetamide, allyl acetate, trimethylallylsilane, and diethyl acetonyallylphosponate, N-allylamidazole, 2-allylpyrrole and mixtures thereof. When an ether group is present on the allyl compound, the ether group can be a functionalized or non-functionalized alkyl, aryl, or cycloaliphatic species. Specific examples include allyl glycidyl ether, heptafluoroisopropyl allyl ether, heptafluoroisopropyl methallyl ether, allyl acetone, methallylacetone, 2-allylcyclohexanone, 1-phenyl-4-pentene-1-one, diallyl ether, and mixtures thereof.

It should be understood that the co-monomer component employed to copolymerize with the hydroxy functional, unsaturated maleate ester can comprise mixtures of two or more of any of the unsaturated monomers described above.

The unsaturated co-monomer component and the diester component described above characteristically react to produce an alternating copolymer rather than a random copolymer. When synthesizing the alternating copolymer, it is preferred to discourage the formation of repeating units of the co-monomer. Additionally, it may be desirable to control the molecular weight of the alternating copolymer. Typically, this is achieved by "starving" the reaction, that is, by adding an amount of initiator to the diester prepared above, then slowly and continuously adding additional initiator and the vinyl co-monomer component to the reaction vessel at a controlled rate such that self-polymerization of the vinyl monomer component is discouraged. When this procedure is followed, it is believed that the reaction product is predominantly an alternating polymer represented by the structural formula $(A_xB_y)_m$, where A represents a single unit comprising a diester, B represents a single unit comprising a vinyl monomer, x and y are equal to 1, and m is an integer larger than 1. In other words, the formation of alternating copolymers where either x or y, or where both x and y, are integers larger than 1 is discouraged. It is theoretically possible that some portions along the copolymer chain contain repeating units of vinyl monomer; however, it is believed that these areas may be essentially eliminated by adjusting the feed rates of the initiator and the vinyl monomer component. Minor amounts of repeating units may not have a perceptible effect on the results, and therefore may be tolerated.

After all the vinyl monomer component has been added, the reaction mixture is usually held at the reaction temperature for a period of time ranging from about 30 minutes to about 8 hours, preferably from about 60 minutes to about 90 minutes, to ensure the reaction is complete. The resultant copolymer solution generally has solids content, determined at 110° C. for 60 minutes, of from about 40 percent to about 95 percent, preferably from about 60 percent to about 80 percent by weight.

The copolymer of the present invention generally has a number-average molecular weight of from about 1,000 to about 100,000, preferably from about 1,000 to about 5,000, more preferably from about 1,500 to about 3,500 as measured by gel permeation chromatography using polystyrene as standard.

The copolymers of the present invention are useful as film-forming binders for coating compositions when combined with a curing agent. Typical crosslinking compounds well known to those skilled in the art as curing agents include, isocyanates, aminoplasts such as melamine-formaldehydes and benzoguanamines, and anhydrides. The coating composition may be a one-package composition, in which case the curing agent is heat-activated, such as a blocked isocyanate or the aminoplasts. The present invention particularly lends itself to use in two-package, room temperature curing compositions, wherein the hydroxy functional copolymer is contained in one package and the curing agent, e.g., a polyisocyanate, is contained in a separate package. Optionally, a third package may additionally be employed comprising a viscosity reducer. The separate packages are blended immediately prior to application of the coating composition onto a substrate. The ability to form a durable, mar resistant coating having good appearance at or only slightly above room temperature is particularly useful for automotive refinish applications.

The coatings of the present invention may be clear or colored, and may serve as primers, base coats, or topcoats. Particular usefulness has been found as a clear topcoat applied over a colored base coat. When the composition is used as a clear coat in a color plus clear composit coating, pigmented base coat is first applied to the substrate. The base coat is then "flashed," that is, left to stand at temperatures ranging from ambient temperature to 80° C. for about 10 seconds to 30 minutes, before a clear topcoating composition is applied to it. Base coat compositions are those well known in the art as described, for example, in U.S. Pat. No. 4,681,811.

If the coating composition is to be a colored coating, it may include a pigment component of a known type. The pigment component can contain inorganic, organic, metallic, metallic-effect, filler and anti-corrosive pigments, and mixtures thereof. Suitable inorganic pigments include titanium dioxide, iron oxide, lead chromate, chrome green, cadmium sulfide, lithopone pigments, and the like. Suitable organic pigments include carbon black; monoazo, diazo, and benzimidazolone yellows, oranges, reds, and browns; phthalocyanine blues and greens; anthraquinone pigments ranging from yellow to blue; quinacridone yellows, reds and violets; perylene reds and browns; indigoid reds, blues, and violets; thioindigo violets; isoindolinone yellows, oranges and reds; quinoline yellows, and the like. Suitable metallic and metallic-effect pigments include aluminum, zinc, lead, bronze, copper, stainless steel and mica flake, and the like. Suitable filler pigments include magnesium silicate clays, fumed or precipitated silicas, barytes, blanc fixe, china clay, and the like. Suitable anti-corrosive pigments include lead oxide, zinc chromate, zinc phosphate, micaceous iron oxide, and the like. Mixtures containing any of the pigments described above are also suitable.

Optionally, the coatings may further contain a diluent. The diluent serves to reduce the viscosity of the dispersion and to assist in pigment wetting. Typically, the diluent comprises an organic solvent. Suitable organic solvents include ketones such as methyl isobutyl ketone, methyl ethyl ketone, diisobutyl ketone, and the like; esters such as butyl acetate, isobutyl acetate, pentyl propionate, and the like; alcohols such as methanol, ethanol, propanol, butanol, isobutanol, and the like; or glycol ethers such as the monoalkyl ethers of ethylene glycol, diethylene glycol, or propylene glycol, and the like.

Although organic solvents are the preferred diluents, suitable alternative diluents include nonreactive oligomeric or polymeric materials with a viscosity ranging from about 20 centipoise to about 1,000 centipoise as measured with a Brookfield viscometer at about 72° F. (22° C.) and a glass transition temperature lower than about 35° C. as measured by any of the common thermal analytical methods well understood by those skilled in the art. Specific examples include plasticizers such as tributyl phosphate, dibutyl maleate, butyl benzyl phthalate, dibutyl benzyl phthalate and mixtures thereof; and silane compounds such as vinyl trimethoxy silane, gammamethacryloxypropyl trimethoxy silane, and mixtures thereof.

Mixtures of organic solvents or mixtures of organic solvents with the nonreactive oligomeric or polymeric diluents may also be used, provided there is no phase separation when the diluents are mixed with the copolymer of the present invention. When present, the diluent is generally used at a level of from about 0.1 percent to about 500 percent, preferably from about 20 percent to about 400 percent, more preferably from about 50 percent to about 200 percent by weight, the percentages based on the weight of solids (resin and pigment) present in the composition.

Optionally, the coatings may contain an auxiliary polymer. The purpose of the auxiliary polymer is to modify the properties of the coating composition. For example, it is often desirable to increase the solids level of a pigment dispersion or a coating composition without producing a large increase in viscosity. Or it may be desirable to modify the pigment wetting characteristics of the vehicle used to prepare the pigment dispersion. Similarly, it is often desirable to modify certain physical properties of the coating composition to which the pigment dispersion is subsequently added, for example the appearance, gloss, humidity resistance, mar resistance or chemical resistance of the cured film. A variety of materials are suitable for use as the auxiliary polymer. These include, but are not limited to, acrylic polymers, polystyrene polymers, acrylonitrile polymers, polyester polymers, epoxy polymers, polyamide polymers, butadiene polymers, polyalkylene polymers, polyalkylene glycol polymers, aminoplast resins, polyurethane polymers, polysilane polymers, polysiloxane polymers, and the like. Additionally, the auxiliary polymer may contain functional groups including but not limited to hydroxyl groups, carboxyl groups, amino groups, epoxy groups, phosphate groups, and the like. Mixtures of auxiliary polymers are also appropriate. Methods for preparing such auxiliary polymers are well understood by those skilled in the art of polymer chemistry, and need not be described in further detail here. When present, it is preferred that the auxiliary polymer be present at a level of from about 0.10 percent to about 100 percent, preferably from about 1 percent to about 50 percent, more preferably from about 2 percent to about 25 percent by weight, the percentages based on the weight of solids of the primary film-forming polymer present in the composition.

The coating compositions may contain other optional ingredients, for example, anti-settling additives, pigment wetting additives, gassing inhibitors, corrosion inhibitors, anti-foaming additives, surface tension modifiers, mildewcides, rheology modifiers, waxes, metal passivators, UV light absorbers, anti-oxidants, UV light stabilizers, and the like. When present, these additives are generally used at a level of from 0.01 percent to 5 percent by weight, the percentages based on the weight of total solids in the composition, although the amounts may vary according to particular application.

The coming composition can contain other optional ingredients, such as inorganic or organic acids or bases and the like. When present, these materials are generally used at a level of from about 0.01 percent to about 50 percent, preferably from about 0.10 percent to about 5 percent by weight, the percentages based on the weight of the film-forming polymer used in the coating composition.

The coating compositions of the present invention may be applied to any of the various substrates to which they adhere, particularly metal or plastic. Optionally, the substrate may have been previously coated with a primer coating composition. The compositions can be applied by conventional means, including brushing, dipping, flow coating, spraying and the like, but preferably, they are applied by spraying. The usual spray techniques and equipment for air-spraying can be used.

The following examples illustrate several embodiments of the present invention for the sake of describing the best mode of the invention, but it should be understood that the scope of the invention is not limited to these particular embodiments. Example 1 sets forth the synthesis of an embodiment of hydroxy functional diester of maleic anhydride and its copolymerization with vinyl monomers. Examples 2, 3, and 4 describe copolymerization of other embodiments of hydroxy functional diesters of unsaturated anhydride with various vinyl monomers. Examples 5, 6, and 7 are two-package, polyisocyanate cured coating compositions incorporating the copolymers of Examples 1, 2, and 3, respectively. Example 8 is a commercial, two package urethane coating composition which has been included for the sake of comparison.

EXAMPLE 1

Preparation of Ethyl 2-Hydroxypropyl Maleate and Polymerization with 1-Octene and Styrene To a 4 neck 5, liter flask equipped with an air motor and stirrer, thermometer addition funnels, and a water condenser, on top of which a dry ice condenser was placed, was added 784 grams (8 moles) of maleic anhydride and 540 grams of 95/5 ethanol/methanol mixture. This was heated to 50° C. and allowed to exotherm. When the exotherm subsided, the system was stabilized at 85° C. to constant acid value. At that point, 5 grams of triphenylphosphite and 4 grams of triphenyl phosphine were added. Then 695 grams of propylene oxide was added over 5 hours and the system held until an acid value of under 1 was attained. At 85° C. a vacuum was slowly applied, and the excess alcohol and oxide were removed and disposed of after the vacuum was broken with nitrogen. The ethyl 2-hydroxypropyl maleate product was then heated to 135° C. and stabilized. To this the initiator di-t-amylperoxide and a monomer mixture of 1-octene and styrene were added in the following manner. There was a pre-feed of the initiator di-t-amylperoxide (208.8 grams total) of ten minutes before starting the monomer mixture of 448 grams of 1-octene (4 moles) and 416 grams of styrene (4 moles). The initiator was added over 2 hours and the monomers over 1.5 hours. There was a hold period of 2 hours, and then a sample was taken for measuring solids, viscosity and color. The batch was adjusted to a Gardner Viscosity of Z to Z2 with butyl acetate, and final analysis was done on the solution polymer. The product had the following properties:

Solids 71.4%

Gardner Viscosity Z2(−)

Gardner Color 1

Hydroxyl Value 152.8

Density 8.77 pound per gallon/gal.

Gel Permeation Chromatography:

Peak molecular weight: 4384

$M_n$ (number average molecular weight): 2565

$M_w$ (weight average molecular weight): 7459

EXAMPLE 2

Copolymerization of Methyl 2-Hydroxypropyl Maleate with 1-Hexene and Styrene

To a 1 liter, 4 neck, round bottom flask fitted with a thermometer, stirrer, condenser and addition funnels was added 1 gram of triphenyl phosphite, 188 grams of methyl 2-hydroxypropyl maleate, and 188 grams of butyl acetate. This solution was brought to 90° C. while maintaining a light nitrogen sparge. At 90° C. the sparge was switched to a nitrogen cap, and 92 grams of the initiator LUPERSOL® 575 (t-amyl-peroxy-2-ethylhexoate) from Atochem NA was introduced 10 minutes before the monomer mixture of styrene (52 grams) and 1-hexene (42 grams), a 50/50 molar ratio. The initiator was added over 3 hours and the monomer mixture was added over 2.5 hours. After the additions were complete the solution was held at 90° C. for 2 hours. The solids content at that point was 52%. The solution was maintained at 90° C. while the system was attached to a water pump for reduced pressure distillation. The maximum vacuum obtained was 700 out of 760 millimeters Hg, and the solution was maintained at that pressure for ½ hour at 90° C., after which nitrogen was used to bring the system to ambient pressure. The polymer was adjusted to a Z(-) Gardner viscosity with a 50/50 mixture of butylacetate and ethyl-ethoxypropionate.

EXAMPLE 3

Copolymerization of Methyl 2-Hydroxypropyl Maleate with 1-Octene and Styrene

To a 1 liter, 4 neck round bottom flask fitted with a thermometer, stirrer, condenser and addition funnels was added 1 gram of triphenyl phosphite, 215 grams of methyl 2-hydroxy propyl maleate, and 215 grams of butyl acetate. This solution was brought to 90° C. while maintaining a light nitrogen sparge. At 90° C. the sparge was switched to a nitrogen cap, and 92 grams of the initiator LUPERSOL® 575 (t-amyl-peroxy-2-ethylhexoate) in butylacetate was introduced 10 minutes before the monomer mixture of styrene (53 grams) and 1-octene (67.2 grams), a 50/50 molar ratio. The initiator was added over 3 hours the monomer mixture was added over 2.5 hours. After the additions were complete the solution was held at 90° C. for 2 hours. The solids content at that point was 52%. The solution was maintained at 90° C. while the system was attached to a water pump for reduced pressure distillation. The maximum vacuum obtained was 700 out of 760 mm Hg, and the solution was maintained at that pressure for ½ hour at 90° C., after which nitrogen was used to bring the system to ambient pressure. The viscosity of the polymer was adjusted with butylacetate.

EXAMPLE 4

Copolymerization of Methyl 2-Hydroxypropyl Citraconate with 1-Octene

To a 1 liter, 4 neck, round bottom flask fitted with a thermometer, stirrer, condenser and addition funnels was added 1 gram of triphenyl phosphite, 215 grams of methyl 2-hydroxypropyl citraconate, and 215 grams of butyl acetate. This solution was brought to 90° C. while maintaining a light nitrogen sparge. At 90° C. the sparge was switched to a nitrogen cap, and 92 grams of the initiator LUPERSOL® 575 (t-amyl-peroxy-2-ethylhexoate) was introduced 10 minutes before the monomer 1-octene (134.4 grams). The initiator was added over 3 hours, and the monomer mixture was added over 2.5 hours. After the additions were complete, the solution was held at 90° C. for 2 hours. The solids content at that point was 53%. The solution was maintained at 90° C. while the system was attached to a water pump for reduced pressure distillation. The maximum vacuum obtained was 700 out of 760 mm Hg, and the solution was maintained at that pressure for ½ hour at 90° C., after which nitrogen was used to bring the system to ambient pressure. The viscosity of the polymer was adjusted with butylacetate.

EXAMPLE 5

A two-package coating composition was formulated with the copolymer of Example 1 as follows:

|  | Weight |
| --- | --- |
| PACKAGE 1 | |
| Example 1 Copolymer | 40.779 |
| Dibutyl tin dilaurate[1] | 0.021 |
| Toluene | 1.084 |
| TINUVIN 384[2] | 1.364 |
| BYK 300[3] | 0.230 |
| EKTASOLVE EEP[4] | 27.044 |
| Sub Total | 70.522 |
| PACKAGE 2 | |
| HDT-LV polyisocyanate[5] | 29.478 |
| Total | 100.000 |

[1]Dibutyl tin dilaurate is a catalyst available from ATOCHEM North America, Philadelphia, Pennsylvania.
[2]TINUVIN 384 is a LYV absorber available from Ciba-Geigy Corporation, Hawthorne, New York.
[3]BYK 300 is an additive available from BYK-Chemie USA Wallingford, Connecticut.
[4]EKTASOLVE EEP is a solvent available from Eastman Chemical Products Kingston, Tennessee.
[5]HDT-LV is a low viscosity hexane diisocyanate trimer available from Rhone-Poulenc Inc., Fine Organics Division, Cranbury, New Jersey.

EXAMPLE 6

A two-package coating composition was formulated with the copolymer of Example 2 as follows:

|  | Weight |
| --- | --- |
| PACKAGE 1 | |
| Example 2 Copolymer | 35.116 |
| Polyester[6] | 3.725 |
| Dibutyl tin dilaurate | 0.056 |
| Toluene | 2.882 |
| TINUVIN 384 | 1.318 |
| TEGO 425[7] | 0.223 |
| Methyl amyl ketone | 3.910 |
| Butyl acetate | 5.027 |
| Sub Total | 52.257 |
| PACKAGE 2 | |
| HDT-LV polyisocyanate | 28.524 |
| Methyl amyl ketone | 19.219 |
| Sub Total | 47.743 |
| Total | 100.00 |

[6]A polyester auxiliary resin made by reacting weight of 26.5 weight percent of 1,4 cyclohexyldicarboxylic acid, 21.9 percent isostearic acid, and 41.7 percent trimethylol propane. The reaction was carried out at 200° C. in the presence of 0.12 weight percent dibutyl tin oxide based on monomer solids, and was continued until an acid value of less than 4 was obtained. The resulting resin was then thinned to 90 percent solids with methyl amyl ketone.
[7]TEGO 425 is a surfactant available from TEGO Chemie Service USA A Division of Goldschmidt Chemical Corp., Hopewell, VA

EXAMPLE 7

A two-package coating composition was formulated with the copolymer of Example 3 as follows:

|  | Weight |
| --- | --- |
| PACKAGE 1 | |
| Example 3 Copolymer | 40.977 |
| Dibutyl tin dilaurate | 0.060 |
| Toluene | 3.076 |
| TINUVIN 384 | 1.413 |
| TEGO 425 | 0.477 |
| EKTASOLVE EEP | 26.265 |
| Sub Total | 72.268 |
| PACKAGE 2 | |
| HDT-LV polyisocyanate | 27.732 |
| Total | 100.000 |

EXAMPLE 8 (Comparative)

|  | Volume |
| --- | --- |
| PACKAGE 1 | |
| Commercial urethane[8] | 2 |
| PACKAGE 2 | |
| Commercial hardener[9] | 1 |
| Total | 3 |

[8]DELTA ® DCD-35 clear urethane from PPG Industries, Inc.
[9]DU-6 urethane hardener from PPG Industries, Inc.

The coating compositions of Examples 5, 6, 7, and 8 were each applied onto thirty-two gauge steel panels pretreated with zinc phosphate obtained from Advanced Coating Technologies, Inc. Hillsdale, Mich. as "ACT cold roll steel B952 P60 DIW; polish." The panels were prepared prior to coating as follows. The test panels were primed with PRIMA® acrylic/urethane primer-surfacer from PPG Industries, Inc., then sanded with 400 grid sand paper after overnight dry. A sealer made by mixing one volume DP 40 Epoxy Primer with one volume DP 401 Epoxy Primer Catalyst and ½ volume of DT 870 medium temperature reducer solvent blend (all available from PPG Industries, Inc.) was next applied and permitted to dry for one hour. Then a base coat made by mixing one volume DELTRON® DBU 16642 base coat and 1.5 volume DRR 1170 reactive reducer (all available from PPG Industries, Inc.) was applied. The base coat was dried 30 minutes, after which the clear coat compositions of the Examples were applied.

Test coatings were left to dry overnight at room temperature before being testing for gloss and pencil hardness. Additional pencil hardness testing was performed after one week of drying at room temperature. The pencil hardness tests were conducted in accordance with ASTM D 3363. Wood was stripped from Eagle-Tortoise pencils of varying hardness, leaving the full diameter of lead exposed to a length of 1/4 inch to 3/8 inch. The end of the lead was flattened at 90 degrees to the pencil axis, and holding the pencil at 45 degrees to the film surface, the pencil was pushed forward about 1/4 inch using as much downward pressure as could be applied without breaking the lead. The result was reported as the highest pencil hardness that produced no rupture of the film. The scale of pencil hardness, from softest to hardest, is as follows:

6B, 5B, 4B, 3B, 2B, B, HB, F, H, 2H, 3H, 4H, 5H, 6H, 7H, 8H, 9H, 10H.

Gloss was measured in accordance with ASTM D 523 using a 20 degree BYK Gardner Glossgard IIa gloss meter. Gloss was reported in terms of percent reflected light.

Viscosity of the mixed components immediately prior to application of the coating onto the panels was measured by using a Brookfield LVT viscometer from Brookfield Engineering Co., Stoughton, Mass., using the number 2 spindle at 60 rpm.

Tack time was measured by determining the time in minutes from the time of application of each coating composition until the coating no longer felt sticky when a light pressure of the forefinger was applied to the coating surface.

Gel time was measured by determining the time in minutes from mixing the coating components in preparation for spraying until the mixed coating composition was no longer fluid, i.e. appeared as a solidified mass.

The results of these tests for each of the tested Examples is set forth in Table I.

TABLE I

| Example No. | 20° Gloss | Tack Free (Min.) | Pencil Hardness 24 Hr. | Pencil Hardness 1 Week | Viscosity Brookfield Initial | Gel Time (Hrs.) |
| --- | --- | --- | --- | --- | --- | --- |
| 5 | 91 | 120 | 6B | 5B | 60 | 5 |
| 6 | 88 | 150 | 4B | HB | 25 | 2 |
| 7 | 90 | 150 | 6B | 4B | 80 | 1.5 |
| 8 | 91 | 120 | 6B | B | 25 | 2 |

An additional test for mar resistance was conducted by applying each of the clear coats of Examples 5, 6, 7, and 8 onto another set of test panels. Prior to application of the clear coats, the test panels had been primed, sanded, and sealed as described previously. A black basecoat was then applied to this set of test panels which consisted of a mixture of one volume DELTRON® DBU-9700 basecoat and 1.5 volume DELTRON® DRR-1170 reactive reducer (all available from PPG Industries, Inc.). After the clear coat was applied over the black base coat, the coating was permitted to flash for about 15 minutes and then baked at 140° F. for 40 minutes. The panels were allowed to cure for one week at room temperature before being tested for mar resistance. The panels were coated with a small amount BON-AMI® cleanser to cover approximately one fourth of the panel. Each panel was placed under the arm of the crockmeter (A.A.T.C.C. crockmeter model 5 from Atlas Electric Devices Co., Chicago, Ill.), and a piece of wool felt (supplied by Atlas Electric Devices Co.) was fitted onto the arm in contact with the test panel. The machine was allowed to go through 10 cycles. One cycle is defined by one forward pass and one backward pass of the arm of the crockmeter. The percent gloss retention was determined by the 20° gloss of the resulting marred area divided by the 20° gloss of the untouched area, times 100. The higher the % gloss retention, the better the mar resistance. The mar resistance of the Examples is set forth in Table II.

TABLE II

Mar Resistance

| Example No. | Mar resistance % gloss retention |
| --- | --- |
| 5 | 84 |
| 6 | 72 |
| 7 | 56 |
| 8 | 31 |

Examples 9, 11, 13, and 15 illustrate the preparation of monoesters from maleic anhydride and various alcohols, and Examples 10, 12, 14, and 16 demonstrate the oxyalkylation of those respective monoesters to form additional embodiments of hydroxy diesters suitable for copolymerization with vinyls in accordance with the present invention.

EXAMPLE 9

Preparation of Isopropyl Maleate

A five liter glass reactor equipped with a stirrer, addition funnel, nitrogen atmosphere, reflux condenser, and thermocouple was charged with 1849 grams of maleic anhydride. The solid anhydride was melted by heating to 65° C. Then 1200 grams of 2-propanol were added over 3.5 hours from the addition funnel. After holding another 1.5 hours at 65° C., the temperature was raised to 85° C. and held for 8.75 hours to complete the reaction.

EXAMPLE 10

Preparation of Isopropyl Hydroxypropyl Maleate 2100 grams of 2-propyl maleate (Example 9), 8.12 grams of triphenylphosphine, and 8.12 grams of tri-2-ethylhexylphosphite were charged to a 4 liter stirred stainless steel pressure autoclave. The reactor was twice pressurized with nitrogen then depressurized, finally leaving 0.36 kPa nitrogen. The reactor contents were heated to 85° C., and 829.74 grams of propylene oxide were added over 3 hours. Then 270 grams of propylene oxide were added. After 3 hours, the pressure was lowered to remove residual propylene oxide. The product was a liquid containing less than 100 parts per million propylene oxide, having a viscosity of 75.7 centipoise at 25° C. and an acid number of 0.61 milligrams KOH/gram of solution.

EXAMPLE 11

Preparation of 2-Butyl Maleate

A procedure similar to that for isopropyl maleate was followed, substituting an equimolar quantity of 2-butanol for isopropanol.

EXAMPLE 12

Preparation of 2-Butyl Hydroxypropyl Maleate

Two thousand grams of 2-butyl maleate (Example 11), 5.67 grams of triphenylphosphine, and 5.67 grams of tri-2-ethylhexylphosphite were charged to a 4 liter stirred stainless steel pressure autoclave. The reactor was twice pressurized with nitrogen then depressurized, finally leaving 0.36 kPa nitrogen. The reactor contents were heated to 110° C., and 724 grams of propylene oxide were added over 3 hours. Then 75 grams of propylene oxide were added. After 3 hours, the temperature was reduced to 100° C. and the pressure was lowered to remove residual propylene oxide. The product was a liquid containing less than 100 parts per million propylene oxide and having a viscosity of 172 centipoise at 25° C., density of 1.097 g/cc, and an acid number of 6.1 milligrams KOH/gram of solution.

EXAMPLE 13

Preparation of Cyclohexyl Maleate

A reactor was charged with 1681 grams of maleic anhydride, which was melted under a nitrogen atmosphere. Then 1818 grams of cyclohexanol was added gradually over 3.3 hours at a reactor temperature of 60° to 65° C. Then the reactor was heated to 85-90° C. and held for 9.5 hours.

EXAMPLE 14

Preparation of Cyclohexyl 2-Hydroxypropyl Maleate

In a procedure similar to that for 2-butyl hydroxypropyl maleate (Example 12), 1400 grams of cyclohexyl maleate (Example 13) was converted to cyclohexyl 2-hydroxypropyl maleate by reaction with 449 grams of propylene oxide. The reaction temperature was 85° C., and the reaction time was 1 hour. The vacuum stripping time was 2.5 hours at 80° to 85° C. The reaction product had a viscosity of centipoise at 25° C. and an acid number of 27.3 milligrams of KOH per gram of solution.

EXAMPLE 15

Preparation of 2-Methoxy- 1-Propyl Maleate

Maleic anhydride (2028 grams) and 2-methoxy-1-propanol (1972 grams) were combined by adding the alcohol to the molten anhydride at 60°–65° C., in a manner similar to that for the preparation of isopropyl maleate.

EXAMPLE 16

Preparation of 2-Methoxy-1-propyl Hydroxypropyl Maleate

2-Methoxy-1-propyl maleate (1600 grams) from Example 15 and 5.19 grams of triphenylphosphine were combined in a 4 liter stirred stainless steel autoclave. After purging 3 times with nitrogen, the reactor was pressured to 0.36 kPa with nitrogen and heated to 85° C. Then 749 grams of propylene oxide were added over 3 hours. After 1 hour more at 85° C., 100 grams of propylene oxide were added, and the temperature maintained for two more hours, at which time a sample was taken. The acid content of the sample was 0.55 milligram KOH/gram. The product was then stripped of residual propylene oxide at 85° C. for 3 hours under vacuum. The product had a viscosity of 104 centipoise at 25° C., and a density of 1.13 grams/cc. The residual 2-methoxy-1-propanol content was 2.65%.

In Examples 17 through 20 the cyclohexyl hydroxypropyl maleate of Example 14 was copolymerized with various vinyl monomers to form hydroxy functional polymers that have utility in coating compositions and other applications in which they may be cured with crosslinking agent reactive with hydroxyl groups.

EXAMPLE 17

Polymerization of Cyclohexyl Hydroxypropyl Maleate and Isobutylene 722 grams of AROMATIC® 100 aromatic solvent blend from Exxon was charged to a four liter autoclave. The autoclave was evacuated and repressurized to 35 kPa with nitrogen, and the evacuation and repressurization were repeated two more times. At 97° C., 147 milliliters of a solution of 189 grams of t-amyl peroctoate and 170.7 grams of AROMATIC 100 aromatic solvent was added over 2 hours. During the same 2 hours, 378.5 grams of isobutylene and 1656 grams of cyclohexyl 2hydroxypropyl maleate (Example 14) were added at a constant rate. Once the feeds above were completed, 147 grams more of the initiator solution was added over 3 hours. Then the reaction temperature of 97° C. was maintained for an additional half hour, whereupon the reactor was cooled and vented. The residual monomer was stripped at 80° C. for 5 hours. The product had a measured solids of 73%, viscosity of 2650 centipoise at 25° C. (Brookfield; spindle number 4 at 12 rpm), number average molecular weight (measured by gel permation chromatography, polystyrene as standard) of 1419, and weight average molecular weight of 4903.

EXAMPLE 18

Polymerization of Cyclohexyl Hydroxypropyl Maleate, Isobutylene, and Dibutyl Maleate In a procedure similar to that for the polymerization of cyclohexyl maleate and isobutylene above, 496 grams of AROMATIC 100 aromatic solvent was charged to the autoclave and 175.8 milliliters of a solution of 162 grams of t-amyl peroctoate and 145.6 grams of AROMATIC 100, 597.5 grams of dibutyl maleate, 282 grams of isobutylene, and 491 grams of cyclohexyl 2-hydroxypropyl maleate (Example 14) were charged over 2 hours. During the next two hours, at 97° C., 58.6 milliliters of the initiator solution were added. After an additional half hour, the reactor was cooled and vented. Vacuum stripping resulted in a product of 68% solids with a viscosity of 314 centipoise at 25° C. (Brookfield; spindle number 2 at 60 rpm). The acid value was 3.8 milligrams KOH/gram of solution. The monomer content was 0.29% cyclohexyl 2-hydroxypropyl maleate and 1.07% dibutyl maleate of the final solution.

EXAMPLE 19

Polymerization of Cyclohexyl Hydroxypropyl Maleate and 1-Hexene

To a 4 liter stirred stainless steel autoclave 722 grams of AROMATIC 100 aromatic solvent and 737 grams 1-hexene were charged. Following nitrogen purging, and leaving a low nitrogen pressure (0.36 kPa) on the autoclave, then heating to 97° C., the following were fed to the reactor over 2 hours: 147 milliliters of a solution of 189 grams t-amyl peroctoate and 171 grams AROMATIC 100, and 1122 grams cyclohexyl 2-hydroxypropyl maleate (Example 14). Then an additional 147 milliliters of the initiator solution were added over 3 hours. After an additional hold at the reaction temperature of 97° C., the reactor was cooled. The reaction product had a measured solids of 57.3%, and a viscosity of 54.9 centipoise at 25° C. (Brookfield; spindle number 1 at 60 rpm).

EXAMPLE 20

Polymerization of Cyclohexyl Hydroxypropyl Maleate and 1-Decene

In a polymerization similar to that above, the copolymer was formed under the following reaction parameters:
Solvent: 496 grams toluene
Initiator solution: 192 grams t-amyl peroctoate and 146 grams toluene
Three hour feeds: 176 milliliters initiator solution
682 milliliters 1-decene 791 grams cyclohexyl 2-hydroxypropyl maleate (Example 14)
Reaction Temperature: 97° C.
Two hour post feed: 58.6 milliliters initiator solution
Hold time following initiator feed: 0.5 hour.

The product solids were 51.7%, and the viscosity was 30.2 centipoise at 25° C. (Brookfield; spindle number 1 at 60 rpm). The acid value of the product was 6.1 milligrams KOH per gram of solution.

STABILITY TEST FOR MONOMALEATE ESTERS

A series of maleate monoesters was prepared from the following alcohols: ethyl alcohol, n- propyl alcohol, n-hexyl alcohol, and isopropyl alcohol by techniques similar to that used for isopropyl maleate in Example 9. During the preparation of these maleate monoesters the temperature was no higher than 65° C. Each of the monoesters was heated for 64 hours at 60° C., then analyzed by 13C NMR. The carbonyl region was integrated to determine the relative amounts of maleic acid, monoester, diester, and maleic anhydride present both before and after heating. The results are presented in Table III.

Immediately following heating, all samples were liquid; however, after standing, the n-hexyl maleate sample contained a precipitate which was identified as largely maleic acid by NMR. The conclusion reached from the data is that the secondary isopropyl maleate is stable at the 60° C. temperature for extended periods, whereas the primary alcohols (ethyl, n-propyl, and n-hexyl) disproportionate into maleic acid and dialkyl maleates.

TABLE III

Stability Test for Maleate Monoesters

| Example | Ester Type | Mole % | | | |
|---|---|---|---|---|---|
| | | Maleic Acid | Monomaleate Ester | Dimaleate Ester | Maleic Anhydride |
| Before Heating (RT Control) | | | | | |
| 21 | Ethyl | 6.07 | 76.87 | 17.04 | 0.00 |
| 22 | n-Propyl | 7.36 | 83.96 | 8.24 | 0.42 |
| 23 | n-Hexyl | 7.08 | 83.81 | 9.09 | 0.00 |
| 24 | Isopropyl | 4.70 | 90.67 | 2.76 | 1.84 |
| After Heating (64 hours at 60 C.) | | | | | |
| 21 | Ethyl | 11.456 | 64.747 | 23.796 | 0.000 |
| 22 | n-Propyl | 9.451 | 74.882 | 15.304 | 0.364 |
| 23 | n-Hexyl | 7.001 | 77.639 | 12.903 | 2.456 |
| | Solid: | 51.340 | 41.571 | 7.090 | 0.000 |
| 24 | Isopropyl | 4.439 | 90.673 | 2.377 | 2.511 |

The use of secondary alcohols to form the monoesters is the subject of co-pending, commonly owned U.S. patent application Ser. No. 541748 titled "UNSATURATED MONO-ESTERS AND THEIR USE IN COATING COMPOSITIONS" filed on even date herewith by Edward E. McEntire and Lyle L. Foringer.

Examples 25 and 26 show the copolymerization of the unsaturated, hydroxy functional diesters of the present invention with a combination of olefins and fluoro-monomers. The resulting polymers have utility in coating applications that require high durability, such as for exterior architectural components. This type of coating may include melamine type curing agents and may be thermally cured.

EXAMPLE 25

Polymerization of Hydroxyalkyl Maleates, Propylene, Fluoro-monomer

To a 4 liter stirred stainless steel autoclave were charged 419.6 grams of AROMATIC® 100 aromatic solvent. Then the reactor was pressured with nitrogen and depressurized twice, leaving 0.36 kPa nitrogen pressure. The reactor was heated with stirring to 97° C, then 168 milliliters of a solution of 209.2 grams of t-amyl peroctoate (LUPERSOL® 575) initiator in 188.3 grams AROMATIC 100 solvent were added over 2 hours. During the same two hours, 860 grams of chlorotrifluoroethylene and 694 grams of methyl hydroxypropyl maleate were added. Propylene (570 grams) was fed over 3 hours, beginning at the same time as the other monomers. After the initiator and first two monomer feeds were completed, an additional 168 milliliters of the initiator solution were fed during the next 3 hours. During the monomer feeds, the pressure reached a maximum of 2840 kPa. Then the temperature was held at 97° C. for another half hour, at which time the pressure had dropped to 1640 kPa. The product was then vacuum stripped at 80° C. for 4 hours to remove residual volatile monomers. The measured solids of the resulting clear, slightly yellow solution was 77.7 percent (determined by heating about 1 gram of the liquid in a vacuum oven at 120° C.). The viscosity was 24,000 centipoise at 25° C. as measured by Brookfield viscometer (spindle 4 at 12 rpm). The hydroxyl value of the polymer solution was 75 milligrams KOH per gram of solution.

EXAMPLE 26

Polymerization of Hydroxyalkyl Maleates, Isobutylene, Fluoro-monomer)

In a polymerization similar to that of Example 25, with monomer feeds of chlorotrifluoroethylene (30 mole %), methyl hydroxypropyl maleate (35 mole %), and isobutylene (35 mole percent), the final polymer had final solids of 69.6% and viscosity of 3750 centipoise (Brookfield viscometer—spindle 4 at 60 rpm). The hydroxyl value was 113.8.

The invention has been set forth in connection with specific embodiments for the sake of disclosing the best mode for carrying out the invention. However, it should be understood that other variations and modifications as are known to those of skill in the art may be resorted to without departing from the scope of the invention as defined by the following claims.

We claim:

1. A coating composition comprising:
   (a) a copolymer comprising the polymerization product of vinyl aromatic monomer, alpha-olefin, and an unsaturated diester monomer in which at least one of the esterifying groups includes a hydroxyl group; and
   (b) a hydroxy group-reactive curing agent.

2. The coating composition of claim 1 wherein the diester groups of the copolymer are the esterification reaction product of an unsaturated anhydride with an alcohol to form a monoester, followed by oxyalkylation of the monoester with an epoxy compound whereby an ester is formed with hydroxy functionality.

3. The coating composition of claim 2 wherein the anhydride is selected from the group consisting of maleic anhydride, citraconic anhydride, and alkyl dialkyl, chloro, and dichloro substitutions thereof; and mixtures thereof.

4. The coating composition of claim 3 wherein the anhydride is selected from the group consisting of maleic anhydride, citraconic anhydride, and mixtures thereof.

5. The coating composition of claim 2 wherein the alcohol is selected from the group consisting of methanol, ethanol, ether alcohols, and mixtures thereof.

6. The coating composition of claim 2 wherein the epoxy compound is an alkylene oxide.

7. The coating composition of claim 2 wherein the alkylene oxide is propylene oxide.

8. The coating composition of claim 2 wherein the epoxy compound is a glycidyl ether.

9. The coating composition of claim 1 wherein the vinyl aromatic monomer is selected from the group consisting of styrene and substituted styrenes.

10. The coating composition of claim 9 wherein the alpha-olefin monomer is selected from the group consisting of $C_2$ to $C_{12}$ alpha-olefins.

11. The coming composition of claim 10 wherein the alpha-olefin is a $C_4$ to $C_{10}$ alpha-olefin.

12. The coating composition of claim 1 wherein the hydroxy group-reactive curing agent is selected from the group consisting of polyisocyanates, aminoplasts, and anhydrides.

* * * * *